US009695802B2

(12) United States Patent
Perkinson

(10) Patent No.: US 9,695,802 B2
(45) Date of Patent: Jul. 4, 2017

(54) WIND TURBINE LOAD MITIGATION

(71) Applicant: United Technologies Corporation, Hartford, CT (US)

(72) Inventor: Robert H. Perkinson, Stonington, CT (US)

(73) Assignee: United Technologies Corporation, Farmington, CT (US)

(*) Notice: Subject to any disclaimer, the term of this patent is extended or adjusted under 35 U.S.C. 154(b) by 312 days.

(21) Appl. No.: 14/400,262

(22) PCT Filed: Mar. 1, 2013

(86) PCT No.: PCT/US2013/028646
§ 371 (c)(1),
(2) Date: Nov. 10, 2014

(87) PCT Pub. No.: WO2013/176723
PCT Pub. Date: Nov. 28, 2013

(65) Prior Publication Data
US 2015/0125295 A1 May 7, 2015

Related U.S. Application Data

(60) Provisional application No. 61/650,265, filed on May 22, 2012.

(51) Int. Cl.
F03D 7/04 (2006.01)
F03D 7/02 (2006.01)
(Continued)

(52) U.S. Cl.
CPC ............ F03D 7/0224 (2013.01); F03D 7/04 (2013.01); F05B 2260/79 (2013.01);
(Continued)

(58) Field of Classification Search
CPC .......... F05D 7/0224; F05D 7/04; F05D 7/041; F05D 7/042; F05B 2260/79;
(Continued)

(56) References Cited

U.S. PATENT DOCUMENTS 3,448,663 A * 6/1969 Adams .................... F15B 13/00
91/451
4,266,467 A * 5/1981 Keller ..................... F16K 17/04
137/493.8
(Continued)

FOREIGN PATENT DOCUMENTS

DK EP 2458203 A1 * 5/2012 ........... F03D 7/0224
EP 0670659 A2 9/1995
(Continued)

OTHER PUBLICATIONS

International Search Report and Written Opinion from PCT Application Serial No. PCT/US2013/028646, Dated Jun. 10, 2013, 10 pages.
(Continued)

Primary Examiner — Dwayne J White
Assistant Examiner — Sang K Kim
(74) Attorney, Agent, or Firm — Kinney & Lange, P.A.

(57) ABSTRACT

A wind turbine blade assembly comprises a rotatable hub, a blade secured to the hub, and a pitch system. The pitch system is disposed to rotate the blade with respect to the hub about a pitch axis not extending through an aerodynamic centroid of the blade. The pitch system comprises a hydraulic cylinder pitch actuator and a relief valve. The hydraulic cylinder pitch actuator has first and second pressure chambers. The relief valve is configured to aerodynamically unload the blade by equilibrating the first and second pressure chambers in response to a pressure differential
(Continued)

between the first and second pressure chambers exceeding a critical threshold corresponding to a pre-strain blade twist.

17 Claims, 1 Drawing Sheet

(51) Int. Cl.
   *F15B 13/02* (2006.01)
   *F15B 11/024* (2006.01)

(52) U.S. Cl.
   CPC ............ *F15B 11/024* (2013.01); *F15B 13/021* (2013.01); *Y02E 10/721* (2013.01); *Y02E 10/723* (2013.01)

(58) Field of Classification Search
   CPC .... Y02E 10/721; F15B 11/024; F15B 13/021; F15B 21/14; F15B 2211/3058; F16H 61/4043; F16K 17/065
   See application file for complete search history.

(56) References Cited

U.S. PATENT DOCUMENTS

| | | | |
|---|---|---|---|
| 4,505,945 A | 3/1985 | Dubust et al. | |
| 4,792,281 A | 12/1988 | Coleman | |
| 4,815,936 A | 3/1989 | Stoltze et al. | |
| 7,172,392 B2* | 2/2007 | Wastling | F03D 7/0224 416/135 |
| 7,658,594 B2 | 2/2010 | Christensen et al. | |
| 2004/0261856 A1* | 12/2004 | Klaver | F16K 17/04 137/487.5 |
| 2007/0116886 A1 | 5/2007 | Refke et al. | |
| 2010/0104439 A1* | 4/2010 | Nomaguchi | F03D 7/02 416/147 |
| 2010/0117361 A1 | 5/2010 | Christensen | |
| 2010/0196156 A1* | 8/2010 | Svendsen | F03D 7/0224 416/1 |
| 2010/0226774 A1* | 9/2010 | Deering | F03D 7/0204 416/117 |
| 2010/0232964 A1* | 9/2010 | Geiger | F03D 7/0224 416/156 |
| 2010/0301607 A1* | 12/2010 | Morimoto | F03D 1/0658 290/44 |
| 2011/0020136 A1 | 1/2011 | Numajiri | |
| 2011/0142640 A1 | 6/2011 | Kamata et al. | |
| 2011/0305568 A1 | 12/2011 | Brath et al. | |
| 2012/0063901 A1 | 3/2012 | Matsuda et al. | |
| 2012/0134806 A1 | 5/2012 | Andersen et al. | |
| 2012/0134828 A1 | 5/2012 | Andersen et al. | |
| 2012/0187681 A1* | 7/2012 | Andersen | F03D 7/0224 290/44 |
| 2013/0162014 A1* | 6/2013 | Warfen | B60T 8/5031 303/28 |
| 2014/0026969 A1* | 1/2014 | Helbig | F15B 20/002 137/2 |

FOREIGN PATENT DOCUMENTS

| | | |
|---|---|---|
| EP | 2402596 A2 | 1/2012 |
| EP | 2458203 A1 | 5/2012 |
| EP | 2516851 | 10/2012 |
| KR | 1020120011532 A | 2/2012 |
| WO | WO00/29635 A2 | 5/2000 |

OTHER PUBLICATIONS

International Search Report and Written Opinion from PCT Application Serial No. PCT/US2013/027233, Dated Jun. 10, 2013, 12 pages.

* cited by examiner

WIND TURBINE LOAD MITIGATION

BACKGROUND

The present disclosure relates generally to wind turbines, and more particularly to a load mitigation system for wind turbine blades.

Modern wind turbines typically comprise a plurality of flexible blades extending from a rotor hub. Three-bladed hubs are particularly common among large scale wind turbines. Wind incident on turbine blades rotates the hub with respect to a generator nacelle mounted atop a tower. This nacelle rides a bearing track or rail atop the tower, allowing the nacelle to be yawed so that the hub and blades face incoming wind. Similarly, each blade is mounted to the hub via a bearing assembly that provides the freedom of rotational movement necessary for each blade to be pitched to regulate aerodynamic load and energy capture from the wind. The blades of large wind turbines are usually pitched using hydraulic actuators, although non-hydraulic actuators are fairly common for smaller turbines. Some wind turbines are capable of separately pitching each blade to a different angle, while others pitch all blades identically. Blade pitching is used to avoid premature damage or wear to wind turbine components, and to control wind turbine generator speeds and torques. In particular, blades are commonly pitched to feather for aerodynamic unloading both during prolonged periods of dangerously high wind speeds, and during rapid gusts.

Several methods exist for controlling wind turbine generator speeds and power absorption by pitching wind turbine blades to feather in response to transient gusts. Some wind turbines sense rotor torque, and pitch blades for aerodynamically unloading in response to high torque events. Other wind turbines control blade pitch based on rotor speed, or based on strain sensed via strain gauges in each (or at least one) blade. All of these mechanisms experience a time lag between the onset of a heavy blade load (e.g. from a rapid gust) and subsequent pitch-unloading in response to the heavy blade load. Some wind turbines use twist-bend coupled flexible blades that passively twist to alleviate aerodynamic load as blades deflect under high wind speeds.

SUMMARY

According to one embodiment of the present invention, a wind turbine blade assembly comprises a rotatable hub, a blade secured to the hub, and a pitch system. The pitch system is disposed to rotate the blade with respect to the hub about a pitch axis not extending through an aerodynamic centroid of the blade. The pitch system comprises a hydraulic cylinder pitch actuator and a relief valve. The hydraulic cylinder pitch actuator has first and second pressure chambers. The relief valve is configured to aerodynamically unload the blade by equilibrating the first and second pressure chambers in response to a pressure differential between the first and second pressure chambers exceeding a critical threshold corresponding to a pre-strain blade twist.

According to a second embodiment of the present invention, a method for mitigating aerodynamic loads on a wind turbine blade comprises mounting the blade rotatably to a hub about a pitch axis that does not pass through an aerodynamic centroid of the blade. The blade is pitched by controlling differential pressure between first and second pressure chambers of a hydraulic cylinder extending from the hub to the blade. Pressure between the first and second pressure chambers is equilibrated in response to the differential pressure exceeding a critical threshold corresponding to a pre-strain blade twist.

DETAILED DESCRIPTION

Figure 1:
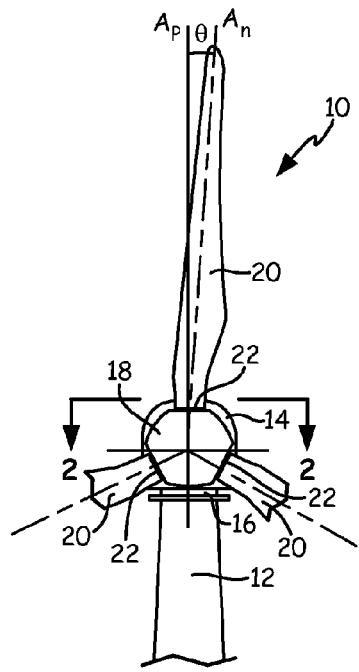
FIG. 1 is a partial front view of a wind turbine.

FIG. 1 is a front view of wind turbine 10, which comprises tower 12, nacelle 14, yaw bearing assembly 16, hub 18, blades 20, and pitch bearing assemblies 22. Wind turbine 10 is a power generating wind turbine that converts the mechanical energy of wind incident on blades 20 into electrical current. Tower 12 is a semi-rigid, elongated structure configured to elevate nacelle 14. Nacelle 14 is a protective housing that encloses an electrical generator (not shown) and associated hardware for generating and conditioning electrical power from rotation of hub 18. Nacelle 14 rides tower 12 via yaw bearing assembly 16, which enables nacelle 14 to rotate 360° atop tower 12. Yaw bearing assembly 16 may, for instance, comprise a system of rails, tracks, or roller bearings providing nacelle 14 with yaw freedom atop tower 12. Nacelle 14 can, for instance, be pitched at any angle along yaw bearings 16 to face incident wind. Wind turbine 10 may include wind speed and direction monitoring sensors (not shown) to ascertain the most advantageous yaw facing of nacelle 14, as well as yaw actuators (not shown) to rotate nacelle 14 into position. Nacelle 14 may include both rigid structural supports (formed, e.g., of cast steel) and lightweight protective housing components (formed, e.g., of fiberglass and/or sheet metal).

Nacelle 14 carries hub 18, a central support that anchors blades 20. Although hub 18 is depicted with three blades 20, configurations with two blades, or with four or more blades, are also possible. Wind incident on blades 20 rotates hub 18 with respect to nacelle 14, driving the electrical generator therein. Blades 20 are elongated airfoil elements with aerodynamic centroids located aft of respective pitch axes $A_p$ (discussed below). Blades 20 may, for instance, be composite airfoils formed primarily of fiberglass. Some embodiments of blades 20 may be hollow, and some embodiments of blades 20 may be formed from a plurality of overlapping laminated layers.

Each blade 20 is pitched on pitch bearing assembly 22 about pitch axis $A_p$ as described in greater detail below with respect to FIG. 2. Blade 20 can be pitched to reduce rotation speed of hub 18 and/or aerodynamic load on blades 20, thereby limiting or avoiding wear or damage to wind turbine 10. Pitch bearing assembly 22 may, for instance, comprise a plurality of cylindrical or tapered roller bearings, ball bearings, or abutting tracks or rails configured to allow blade 20 to rotate about pitch axis $A_p$. In the depicted embodiment, a neutral bending axis $A_n$ is angled at offset angle $\Theta$ relative to pitch axis $A_p$, such that the aerodynamic centroid of each blade 20 is offset from its pitch axis $A_p$, causing direct facing aerodynamic loads on blades 20 (e.g. from wind into the page, in FIG. 1) to exert a pitch torque on blades 20. More generally, blade 20 may take any appropriate shape such that the aerodynamic centroid of blade 20 lies aft of pitch axis $A_p$. As described in greater detail below, resulting pitch torque is used to trigger feathering of blades 20 to mitigate transient aerodynamic loads, thereby avoiding turbine overspeed conditions and/or excessive mechanical strains along blades 20.

Figure 2:
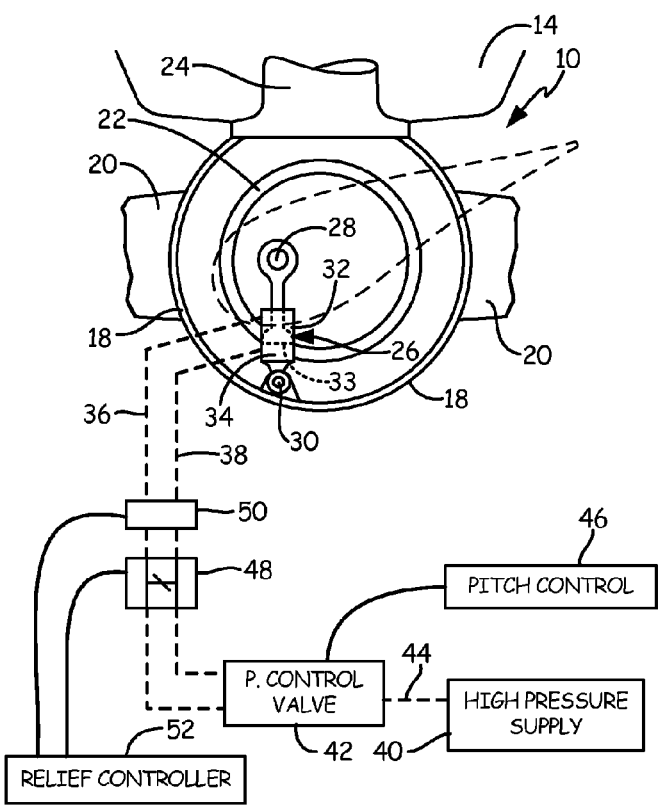
FIG. 2 is a mixed schematic and cross-sectional view of the wind turbine of FIG. 1 through an airfoil blade.

FIG. 2 is a mixed schematic and simplified cross-sectional view of wind turbine 10 through section line 2-2 of FIG. 1. FIG. 2 illustrates nacelle 14, hub 18, blades 20, pitch bearing assemblies 22, rotor 24, hydraulic cylinder 26, pins 28 and 30, first pressure chamber 32, piston 33, second pressure chamber 34, first pressure line 36, second pressure line 38, high pressure supply 40, pitch control valve 42, supply connection 44, pitch controller 46, relief valve 48, pressure sensor 50, and relief controller 52. FIG. 2 depicts two broken-away blades 20 as shown in FIG. 1, as well as a third blade shown in phantom, extending out of the page.

As discussed above with respect to FIG. 1, hub 18 is a rotating support structure that carries blades 20, and attaches rotatably to nacelle 14. Rotor 24 is a rotating component such as a shaft or hub situated at least partially within nacelle 14. Rotor 24 may, for instance, be a permanent magnet generator rotor, or a driveshaft leading to a permanent magnet generator rotor or gearbox. Hub 18 supports each blade 20 via a corresponding pitch bearing assembly 22 disposed to allow blade 20 to rotate about pitch axis $A_p$. Hydraulic cylinder 26 is secured to blade 20 via pin 28 at a location off of pitch axis $A_p$, and to hub 18 via pin 30. Pins 28 and 30 may, for instance, be trunnion pins disposed to allow hydraulic cylinder 26 to rotate with respect to hub 18 as the pitch of blade 20 changes. Hydraulic cylinder 26 is a bi-directional linear hydraulic motor with first and second pressure chambers 32 and 34 separated by piston 33. Hydraulic cylinder 26 may, for instance, use oil as a hydraulic pressure fluid.

Blade 20 is pitched by varying fluid pressures within first pressure chamber 32 and second pressure chamber 34. Fluid pressure in first and second pressure chambers 32 and 34 drives piston 33 to an equilibrium position determined by hydraulic pressure in each pressure chamber and the twisting moments applied to the blade as a result of airflow. This position of piston 33 determines the overall extension of hydraulic cylinder 26, and thereby the pitch angle of blade 20. Higher pressure in first pressure chamber 32 than in second pressure chamber 34 draws in piston 33, exerting a torque on blade 20 that pitches blade 20 to feather. Conversely, higher pressure in second pressure chamber 34 than in first pressure chamber 32 drives piston 33 out, pitching blade 20 into the wind.

First pressure chamber 32 of hydraulic cylinder 26 receives hydraulic pressure fluid from first pressure line 36, while second pressure chamber 34 receives hydraulic pressure fluid from second pressure line 38. Hydraulic pressure fluid is ultimately provided by high pressure supply 40, a pressurized fluid reservoir, but is split between first and second pressure lines 36 and 38 by pitch control valve 42. Pitch control valve 42 receives and returns hydraulic pressure fluid from high pressure supply 40 through supply connection 44, which may for instance be a double fluid line with a supply line and a return line connecting pitch control valve 42 to high pressure supply 40. Pitch control valve 42 regulates pressure to both first and second pressure lines 36 and 38, and can, for instance, be a dual aperture valve that controls relative pressure by separately varying orifice size of apertures to each pressure line, thereby varying corresponding permanent pressure drop from supply connection 44 to first and second pressure lines 36 and 38. In other embodiments, pitch control valve 42 may be a split valve with a fixed total output aperture size configurably split between first pressure line 36 and second pressure line 38.

Although pitch control valve 42 is depicted as a single valve, some embodiments of wind turbine 10 may comprise a plurality of separate pitch control valves 42, such as one pitch control valve each for first pressure line 36 and second pressure line 38.

Pitch control valve 42 is actuated according to instructions from pitch controller 46. Pitch controller 46 may, for instance, be a logic-capable device or subcomponent of a logic-capable device such as a microcomputer or microprocessor configured to control wind turbine 10 so as to handle varying wind speeds, power demand levels, generator conditions, and other factors. Pitch controller 46 may also be responsive to direct user input, e.g. to shut down wind turbine 10 by fully feathering blades 20.

Transient loads from gusts are mitigated by relief valve 48, independently of pitch control valve 42. Relief valve 48 is a switch valve capable of switching between a closed normal operation state $V_n$ wherein first and second pressure lines 36 and 38 are disconnected, and an open relief state $V_r$ wherein first and second pressure lines 36 and 38 are fluidly connected. In some embodiments, the relief state of relief valve 48 may also interrupt first and second fluid lines 36 and 38 to fluidly disconnect first and second pressure chambers 32 and 34 from pitch control valve 42. While relief valve 48 is in normal operation state $V_n$, the pitch of blade 20 is controlled by pitch control valve 42 in response to pitch controller 46, as discussed above. While relief valve 48 is in relief state $V_r$, pressure rapidly equilibrates between first and second pressure chambers 32 and 34, pitching blade 20 to feather as a result of the applied aerodynamic loads and in a direction to aerodynamically unload the blade 20.

As discussed above, the aerodynamic centroid of blade 20 is offset from pitch axis $A_p$, such that aerodynamic loads on blade 20 place a pitch torque $\tau$ on blade 20. Pitch torque $\tau$ tends to drive blade 20 towards feather under transient aerodynamic loads from gusting winds, reducing pressure in first pressure chamber 32 and increasing pressure in second pressure chamber 34. Relief valve 48 ordinarily operates in normal operation state $V_n$, switching to relief state $V_r$ only when differential pressure $\Delta P$ between first and second pressure chambers 32 and 34 (and correspondingly between first and second pressure lines 36 and 38) exceeds a critical threshold $\Delta P_T$ corresponding to a threshold pitch torque $\tau_T$. Threshold pitch torque $\tau_T$ is a safe torque threshold below which blade 20 is unlikely to experience damaging strain. When subjected to heavy winds, blade 20 takes time to deflect under aerodynamic loads to the point of strain. By reactively equilibrating pressures in first and second pressure chambers 32 and 34 in response to any differential pressure $\Delta P$ corresponding to pitch torque $\tau > \tau_T$, relief valve 48 is able to mitigate sudden aerodynamic loads before damaging strain can occur. Particular values of $\tau_T$ and $\Delta P_T$ may vary depending on the construction and materials of blade 20.

In the depicted embodiment, differential pressure $\Delta P$ is sensed by pressure sensor 50. Pressure sensor 50 may, for instance, be an array of two or more absolute pressure electronic sensors disposed along pressure lines 36 and 38, or a direct differential pressure electronic sensor such as a double diaphragm seal sensor. Also in the depicted embodiment, relief controller 52 controls relief valve 48 according to a sensor output of pressure sensor 50, switching relief valve 48 from normal operation state $V_n$ to relief state $V_r$ whenever differential pressure $\Delta P > \Delta P_T$. Relief controller 52 may, for instance, be a microcomputer or microprocessor-based logic-capable device. In some embodiments, relief controller 52 may evaluate sensed pressure based on a critical threshold $\Delta P_T$ that varies as a function of pitch control parameters received from pitch controller 46, or supplied to both pitch controller 46 and relief controller 52. Alternatively, relief valve 48 may be actuated directly in response to a sensor output of pressure sensor 50. In still other embodiments of wind turbine 10, relief valve 48 may be a passively pressure-responsive mechanical valve such as a spring valve that opens automatically whenever pressure in second pressure line 38 exceeds pressure in first pressure line 36 by at least $\Delta P_T$. In various embodiments, relief valve 48 may return to normal operation state $V_n$ as soon as differential pressure $\Delta P$ drops below critical threshold $\Delta P_T$, or may not return to normal operation state $V_n$ until differential pressure $\Delta P$ drops below a separate return threshold $\Delta P_R < \Delta P_T$.

Relief valve 48 allows blade 20 to rapidly pitch to mitigate aerodynamic loads from sudden gusts, thereby unloading blade 20 before significant strain can occur. Relief valve 48 thus reduces wear and risk of damage to blade 20 and other components of wind turbine 10. Relief valve 48 can operate entirely independently of pitch control valve 42 and pitch controller 46, alleviating dangerous aerodynamic loads without any change in the pitch settings determined by pitch control valve 42 and pitch controller 46. Relief valve 48 is thus a modular component than can be added to existing hydraulic blade pitch systems to provide load mitigation without interacting with existing pitch control components. Alternatively, relief valve 48 and pitch control valve 52 can operate together to provide redundant, fail-safe load mitigation via through pitch control valve on top of the faster load shedding provided by relief valve 48.

The following are non-exclusive descriptions of possible embodiments of the present invention.

A wind turbine blade assembly comprising a rotatable hub, a blade secured to the hub, and a pitch system. The blade has an aerodynamic centroid. The pitch system is disposed to rotate the blade with respect to the hub about a pitch axis not extending through the aerodynamic centroid. The pitch system comprises: a hydraulic cylinder pitch actuator with first and second pressure chambers; and a relief valve configured to aerodynamically unload the blade by equilibrating the first and second pressure chambers in response to a pressure differential between the first and second pressure chambers exceeding a critical threshold corresponding to pre-strain blade twist.

The wind turbine blade assembly of the preceding paragraph can optionally include, additionally and/or alternatively, any one or more of the following features, configurations, and/or additional components:

The pitch system further comprises: a pressure source supplying pressure a pressurized fluid to the hydraulic cylinder pitch actuator; first and second pressure lines carrying the pressurized fluid from the pressure source to the first and second pressure chambers, respectively; and a control valve configured to pitch the blade by varying the pressure differential.

Equilibrating the first and second pressure chambers comprises connecting the first and second pressure lines.

Equilibrating the first and second pressure chambers further comprises interrupting the first and second pressure lines.

The relief valve passively equilibrates the first and second pressure chambers in response to the pressure differential exceeding the critical threshold.

The relief valve is a passive mechanical spring valve.

A pressure sensor disposed to sense the differential pressure, wherein the relief valve equilibrates the first and second pressure chambers in response to the sensed differential pressure exceeding the critical threshold.

A logic-capable relief controller configured to control the relief valve based on the sensed differential pressure.

The relief valve ceases to equilibrate the first and second pressure chambers in response to the sensed differential pressure falling below the critical threshold.

The relief valve ceases to equilibrate the first and second pressure chambers in response to the sensed differential pressure falling below a return threshold less than the critical threshold.

A method for mitigating aerodynamic loads on a wind turbine blade comprises: mounting the blade rotatably to a hub about a pitch axis that does not pass through an aerodynamic centroid of the blade; pitching the blade by controlling differential pressure between first and second pressure chambers of a hydraulic cylinder extending from the hub to the blade; and equilibrating pressure between the first and second pressure chambers in response to the differential pressure exceeding a critical threshold corresponding to a pre-strain blade twist.

The method of the preceding paragraph can optionally include, additionally and/or alternatively, any one or more of the following features, configurations, and/or additional components:

Equilibrating pressure between the first and second pressure chambers comprises switching a relief valve state to fluidly connect the first and second pressure chambers.

The relief valve is configured to passively connect the first and second pressure chambers in response to the differential pressure exceeding the critical threshold.

The differential pressure is sensed with an electronic pressure sensor, and the relief valve is actuated based on the sensed differential pressure.

Actuating the relief valve based on the sensed differential pressure comprises opening the relief valve to equilibrate pressure between the first and second pressure chambers whenever the sensed differential pressure exceeds the critical threshold.

Actuating the relief valve based on the sensed differential pressure further comprises closing the relief valve to equilibrate pressure between the first and second pressure chambers whenever the sensed differential pressure drops below the critical threshold.

Actuating the relief valve based on the sensed differential pressure further comprises closing the relief valve to equilibrate pressure between the first and second pressure chambers whenever the sensed differential pressure drops below a return threshold below the critical threshold.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:
1. A wind turbine blade assembly comprising:
a rotatable hub;
a blade secured to the hub, the blade having an aerodynamic centroid; and a pitch system disposed to rotate the blade with respect to the hub about a pitch axis not extending through the aerodynamic centroid, the pitch system comprising:
   a hydraulic cylinder pitch actuator with first and second pressure chambers; and
   a relief valve configured to aerodynamically unload the blade by equilibrating the first and second pressure chambers in response to a pressure differential between the first and second pressure chambers exceeding a critical threshold corresponding to a pitch torque below which the blade is unlikely to experience damaging strain.

2. The wind turbine blade assembly of claim 1, wherein the pitch system further comprises:
   a pressure source supplying pressure a pressurized fluid to the hydraulic cylinder pitch actuator;
   first and second pressure lines carrying the pressurized fluid from the pressure source to the first and second pressure chambers, respectively; and
   a control valve configured to pitch the blade by varying the pressure differential.

3. The wind turbine blade assembly of claim 2, wherein equilibrating the first and second pressure chambers comprises connecting the first and second pressure lines.

4. The wind turbine blade assembly of claim 3, wherein equilibrating the first and second pressure chambers further comprises interrupting the first and second pressure lines.

5. The wind turbine blade assembly of claim 1, wherein the relief valve passively equilibrates the first and second pressure chambers in response to the pressure differential exceeding the critical threshold.

6. The wind turbine blade assembly of claim 5, wherein the relief valve is a passive mechanical spring valve.

7. The wind turbine blade assembly of claim 1, further comprising a pressure sensor disposed to sense the differential pressure, wherein the relief valve equilibrates the first and second pressure chambers in response to the sensed differential pressure exceeding the critical threshold.

8. The wind turbine of claim 7 further comprising a logic-capable relief controller configured to control the relief valve based on the sensed differential pressure.

9. The wind turbine blade assembly of claim 1, wherein the relief valve ceases to equilibrate the first and second pressure chambers in response to the sensed differential pressure falling below the critical threshold.

10. The wind turbine blade assembly of claim 1, wherein the relief valve ceases to equilibrate the first and second pressure chambers in response to the sensed differential pressure falling below a return threshold less than the critical threshold.

11. A method for mitigating aerodynamic loads on a wind turbine blade, the method comprising:
   mounting the blade rotatably to a hub about a pitch axis that does not pass through an aerodynamic centroid of the blade;
   pitching the blade by controlling differential pressure between first and second pressure chambers of a hydraulic cylinder extending from the hub to the blade; and
   equilibrating pressure between the first and second pressure chambers in response to the differential pressure exceeding a critical threshold corresponding to a pitch torque below which the blade is unlikely to experience damaging strain.

12. The method of claim 11, wherein equilibrating pressure between the first and second pressure chambers comprises switching a relief valve state to fluidly connect the first and second pressure chambers.

13. The method of claim 12, wherein the relief valve is configured to passively connect the first and second pressure chambers in response to the differential pressure exceeding the critical threshold.

14. The method of claim 12, further comprising sensing the differential pressure with an electronic pressure sensor, and actuating the relief valve based on the sensed differential pressure.

15. The method of claim 14, wherein actuating the relief valve based on the sensed differential pressure comprises opening the relief valve to equilibrate pressure between the first and second pressure chambers whenever the sensed differential pressure exceeds the critical threshold.

16. The method of claim 15, wherein actuating the relief valve based on the sensed differential pressure further comprises closing the relief valve to equilibrate pressure between the first and second pressure chambers whenever the sensed differential pressure drops below the critical threshold.

17. The method of claim 15, wherein actuating the relief valve based on the sensed differential pressure further comprises closing the relief valve to equilibrate pressure between the first and second pressure chambers whenever the sensed differential pressure drops below a return threshold below the critical threshold.

\* \* \* \* \*